(12) United States Patent
Xiong et al.

(10) Patent No.: US 8,345,776 B2
(45) Date of Patent: Jan. 1, 2013

(54) SYSTEM AND METHOD OF ERROR CONTROL FOR VIDEO CODING

(75) Inventors: Lianhuan Xiong, Shenzhen (CN);
Steffen Kamp, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 1134 days.

(21) Appl. No.: 12/236,932

(22) Filed: Sep. 24, 2008

(65) Prior Publication Data

US 2009/0074082 A1    Mar. 19, 2009

Related U.S. Application Data

(63) Continuation of application No. PCT/CN2007/000968, filed on Mar. 26, 2007.

(30) Foreign Application Priority Data

Mar. 24, 2006   (CN) .......................... 2006 1 0073427

(51) Int. Cl.
  *H04N 7/12*     (2006.01)
  *H04N 11/02*    (2006.01)
  *H04N 11/04*    (2006.01)
(52) U.S. Cl. .......... 375/240.27; 375/240.01; 375/240.26
(58) Field of Classification Search .................. None
  See application file for complete search history.

(56) References Cited

U.S. PATENT DOCUMENTS

| | | | |
|---|---|---|---|
| 4,698,672 A * | 10/1987 | Chen et al. | 375/240.12 |
| 5,136,377 A * | 8/1992 | Johnston et al. | 375/240.12 |
| 6,961,383 B1 | 11/2005 | Reibman et al. | |
| 2003/0156638 A1 | 8/2003 | Van Der Schaar | |
| 2004/0042549 A1 | 3/2004 | Huang et al. | |
| 2005/0220192 A1 | 10/2005 | Huang et al. | |
| 2006/0104356 A1 * | 5/2006 | Crinon | 375/240.12 |

(Continued)

FOREIGN PATENT DOCUMENTS

CN          1656814          8/2005

(Continued)

OTHER PUBLICATIONS

Julien Reichel et al. Scalable Video Coding—Joint Draft 4. Joint Video Team (JVT) of ISO/IEC MPEG & ITU-T VCEG (ISO/IEC JTC1/SC29/WG11 and ITU-T SG16 Q.6) 17th Meeting: Nice, France, Oct. 2005.

(Continued)

*Primary Examiner* — Joseph Ustaris
*Assistant Examiner* — Kevin McInnish
(74) *Attorney, Agent, or Firm* — Slater & Matsil, L.L.P.

(57) ABSTRACT

A system and method for video coding include an encoder and decoder. The encoder/decoder respectively include a base layer encoding/decoding apparatus, at least one enhancement layer encoding/decoding apparatus, and an encoder/decoder drift control apparatus. The encoder drift control apparatus is configured to determine the amount of local error drift for the encoder according to local information of the base layer encoding apparatus and the enhancement layer encoding apparatus and control the value of an encoder leaky factor according to the amount of error drift. The decoder drift control apparatus is configured to determine the amount of local error drift for the decoder according to local information of the base layer decoding apparatus and the enhancement layer decoding apparatus and control a decoder leaky factor according to the amount of error drift.

7 Claims, 4 Drawing Sheets

U.S. PATENT DOCUMENTS

2007/0201551 A1* 8/2007 Wang et al. ................ 375/240.1

FOREIGN PATENT DOCUMENTS

CN 1674677 9/2005
WO WO-2006109141 A1 10/2006

OTHER PUBLICATIONS

Yiliang Bao et al. CE7 Report, FGS coding for low-delay applications. Joint Video Team (JVT) of ISO/IEC MPEG & ITU-T VCEG (ISO/IEC JTC/SC29/WG11 and ITU-T SG16 Q.6) 17th Meeting: Nice, France, Oct. 14-21, 2005.

Hsiang-Chun Huang et al. A Robust Fine Granularity Scalability Using Trellis Based Predictive Leak. Dept. and Inst. of Electronics Engineering, NCTU, Taiwan. Dept. and Inst. of Computer Science and Information Engineering, NCTU, Taiwan. IEEE, 2002.

Yiliang Bao et al. Improvements to Fine Granularity Scalability for Low-Delay Applications. Joint Video Team (JVT) of ISO/IEC MPEG & ITU-T VCEG (ISO/IEC JTC1/SC29/WG11 and ITU-T SG 16 Q.6) 15th Meeting: Busan, Korean, Apr. 18-22, 2005.

International Telecommunications Union. ITU-T Telecommunication Standardization Sector of ITU. Series H: Audiovisual and Multimedia Systems. Infrastructure of audiovisual service—Coding of moving video. Advanced video coding for generic audiovisual services. Mar. 2005.

Sangeun Han et al. Robust and Efficient Scalable Video Coding With Leaky Prediction. Information Systems Laboratory. Stanford University, Stanford, CA 94305. IEEE ICIP 2002.

First Chinese Office Action regarding Application No. 200610073427.X, mailed Sep. 5, 2008. Translation provided by Huawei Technologies Co., Ltd.

Third Chinese Office Action regarding Application No. 200610073427.X, mailed Aug. 7, 2009. Translation provided by Huawei Technologies Co., Ltd.

International Search Report for International Application No. PCT/CN2007/000968, dated Jun. 19, 2007, with English translation.

Efficient Fine Granularity Scalability Using Adaptive Leaky Factor, Yunlong Gao and Lap-Pui Chau, Senior Member, IEEE Transactions on Broadcasting, vol. 51, No. 4, Dec. 2005.

Stack Robust Fine Granularity Scalability, Hsiang-Chun Huang and Tihao Chiang, Dept. and Inst. of Electronics Engineering, NCTU, Taiwan, 2004.

Simplified JVT-Q039 Scheme, Tiantian Sun, Xiangyang Ji, Jizheng Xu, Feng Wu, Institute of Computing Technology, Microsoft Research Asia, Oct. 2005.

Motion Vectors Based Adaptation of Leak Factor for AR-FGS, Leszek Cieplinski, Mitsubishi Electric ITE-VIL, Jul. 2006.

Improved Adaptation and Coding of Leak Factor in AR-FGS, Steffen Kamp, Mathias Wien, Institute of Communications Engineering, RWTH Aachen University, Jul. 2006.

Local Adaptation of Leak Factor in AR-FGS, Steffen Kamp, Mathias Wien, Institute of Communications Engineering, RWTH Aachen University, Apr. 2006.

Supplementary European Search Report regarding Application No. EP 07720542 dated Sep. 17, 2009.

* cited by examiner

SYSTEM AND METHOD OF ERROR CONTROL FOR VIDEO CODING

CROSS-REFERENCE TO RELATED APPLICATIONS

This application is a continuation of International Application No. PCT/CN2007/000968, filed Mar. 26, 2007. This application claims the benefit and priority of Chinese Application No. 200610073427.X, filed Mar. 24, 2006. The entire disclosures of each of the above applications are incorporated herein by reference.

FIELD

The present invention relates to video coding field, more particularly, to error control system, method for video coding, and encoder and decoder thereof.

BACKGROUND

As a key technique in the video streaming framework of H.264 and MPEG-4, Fine Granularity Scalability (FGS) video coding is able to implement arbitrary truncation of the video code stream by post-processing after coding. The code stream generated by the FGS technique may be adapted to fluctuations of the network bandwidth.

In FGS video coding, motion compensation may improve the coding efficiency and decrease bandwidth requirement. The method for implementing motion compensation is to subtract the reconstructed frame of the motion-compensated encoded frame from the current frame so that the difference between the current frame and the reconstructed frame is encoded for transmission whereas the unchanged content in the current frame remains uncoded and untransmitted. In this way, a motion value can be obtained by estimating the movement of the content of the previous frame, and a higher compression ratio can be achieved by compensating with such motion value in the current frame. The motion compensation is conducted in a closed prediction loop. In the encoding end, the difference between the original signal and the prediction signal after the prediction is transformed on a block basis. The transformation coefficient forms an output code stream after quantization and coding. In the decoding end, the quantized transformation coefficient may be inversely transformed and subsequently added to the current prediction signal to form a reconstructed frame which, in turn, serves as the prediction signal for a successive sequence.

The code stream of the FGS video coding includes a base layer and at least one enhancement layer. In order to improve the coding efficiency, a high-quality reference image, constituted by part of the enhancement layer, is adopted during enhancement layer coding. In the case where the network is inadequate to transmit the code stream of the enhancement layer due to the reasons, such as network fluctuation, the decoding end will abandon parts of or the entire high-quality reference image. Such difference of the high-quality images between the encoding end and the decoding end inevitably leads to error propagation and accumulation and thus impairs the quality of the encoded image. To overcome the foregoing defects, a leaky factor α is introduced in the enhancement layer so as to perform an additional motion compensation upon the reconstructed image of high quality. Motion compensation with leaky factor α means that, when reconstructing the high-quality reference image, α attenuation is initially performed upon the coefficients obtained by subtracting the reconstructed base layer from the high-quality prediction image of the previous frame, and then the attenuated coefficients are added with the reconstructed base layer to constitute a high-quality reference image of motion compensation. The quality of the reference image can be controlled by selecting different values for a so as to make the quality of the reconstructed frame allowable by the network bandwidth as best as possible and minimize the difference between the image of the encoding end and the image of the decoding end. Currently, a global α is generally set on the basis of the entire image sequence. The way to set the global leaky factor α is to encode a leaky factor in every piece of slice header information and then change the probability of the amount of leakage (i.e., adjust the leaky factor) by the decoder according to the state of the current frame. This method is a trade-off between the prevention of prediction drift and the compression of efficiency.

Generally, in practice, the above method of determining the global leaky factor α can be employed when the following requirements are satisfied. The above method may be employed when there is no transformation coefficient to be encoded in the base layer, for example, in the instance where the prediction error for the amount of the drift is very small. In this case, the prediction of the amount of drift already has a sound performance. Alternatively, the above method may be employed when there are few transformation coefficients of importance in the base layer. In this case, the coefficients to which the leakage prediction for the enhancement layer corresponds may be excluded. The adjustment of the leaky factor is accomplished by computing every signal transformation and inverse transformation in the prediction loop. In the process of adjusting the leaky factor, the leaky factor needs to be selectively adjusted in the transformation domain. Alternatively, the above method of determining the global leaky factor may be employed when there are quite a lot of transformation coefficients of importance in the base layer and the leakage prediction is completely closed.

The decoding end in the method adjusts the leaky factor according to the current frame and the drift. However, the actual drift is not generated by the current frame. Therefore, it is not ideal to utilize the leaky factor which is set in accordance with the above method to control the amount of drift, which means that the above method of setting the leaky factor is not able to set a best leaky factor. Moreover, in the above method of setting the leaky factor, additional transformation and inverse transformation has to be introduced such that the complexity of encoding and decoding computation is increased. Therefore, the method may not be universally applicable.

SUMMARY

To overcome the defect that the prior art is not able to achieve both merits of preventing the error drift and compressing the efficiency, embodiments of the present invention provide an error control system, method, encoder and decoder for video coding.

The error control system for video coding provided by an embodiment of the present invention includes an encoder and a decoder. The encoder includes a base layer encoding apparatus and at least one enhancement layer encoding apparatus. The decoder includes a base layer decoding apparatus and at least one enhancement layer decoding apparatus. The encoder further includes an encoder drift control apparatus, and the decoder further includes a decoder drift control apparatus.

The encoder drift control apparatus is configured to determine the amount of local error drift for the encoder according to the local information of the base layer encoding apparatus and the enhancement layer encoding apparatus, and control an encoder leaky factor according to the amount of error drift.

The decoder drift control apparatus is configured to determine the amount of local error drift for the decoder according to the local information of the base layer decoding apparatus and the enhancement layer decoding apparatus, and control a decoder leaky factor according to the amount of error drift.

An embodiment of the present invention further provides an encoder in the error control system for video coding. The encoder includes a base layer encoding apparatus and at least one enhancement layer encoding apparatus. The encoder further includes an encoder drift control apparatus.

The encoder drift control apparatus is configured to determine the amount of local error drift for the encoder according to the local information of the base layer encoding apparatus and the enhancement layer encoding apparatus, and control the value of an encoder leaky factor according to the amount of error drift.

An embodiment of the present invention further provides a decoder in the error control system for video coding. The decoder includes a base layer decoding apparatus and at least one enhancement layer decoding apparatus. The decoder further includes a decoder drift control apparatus.

The decoder drift control apparatus is configured to determine the amount of local error drift for the decoder according to the local information of the base layer decoding apparatus and the enhancement layer decoding apparatus, and control the value of a decoder leaky factor according to the amount of error drift.

An embodiment of the present invention further provides an error control method for video coding. The method includes determining the amount of local error drift for encoder/decoder according to the local information of the encoder/decoder; and adjusting an encoder/decoder leaky factor according to the amount of local error drift.

Compared with the prior art, the various embodiments of the present invention possesses the below advantages.

Various embodiments of the present invention control the value of the leaky factor according to the local information and adjust the extent of truncation of the code stream of the enhancement layer accordingly. In this way, optimized compression efficiency can be achieved. Moreover, because the prediction signals collected by the drift control apparatus can be used in both the encoder and the decoder, the synchronization of the encoder and the decoder may control the drift and may be able to make the prediction signals of the encoder and decoder, with a certain percentage, very close to each other according to the possibility of the code streams being truncated.

Additionally, because the error drift of the decoding end is prevented, when the enhancement layer is incomplete at the decoding end and the mismatched error drift of the encoding end and the decoding end occurs, the performance of the rate distortion profile at the points with low code rate is enhanced. That is, the performance of the image is enhanced (because the objective quality of the image is evaluated based on a comprehensive performance of both the code rate and the distortion rate. The better the RD, the better the objective quality of the image is.). As such, the best image quality can be achieved with some restrictions for transmission rate.

DETAILED DESCRIPTION

The description is made to the detailed embodiments of the present invention in conjunction with the accompanying drawings.

The error control system for video coding provided by an embodiment of the present invention includes an encoder and a decoder. The encoder includes a base layer encoding apparatus and an enhancement layer encoding apparatus. The decoder includes a base layer decoding apparatus and an enhancement layer decoding apparatus. In practice, a plurality of enhancement layers may be included in the encoder and the decoder. By way of example, the embodiment is illustrated with only one enhancement layer.

Figure 1:
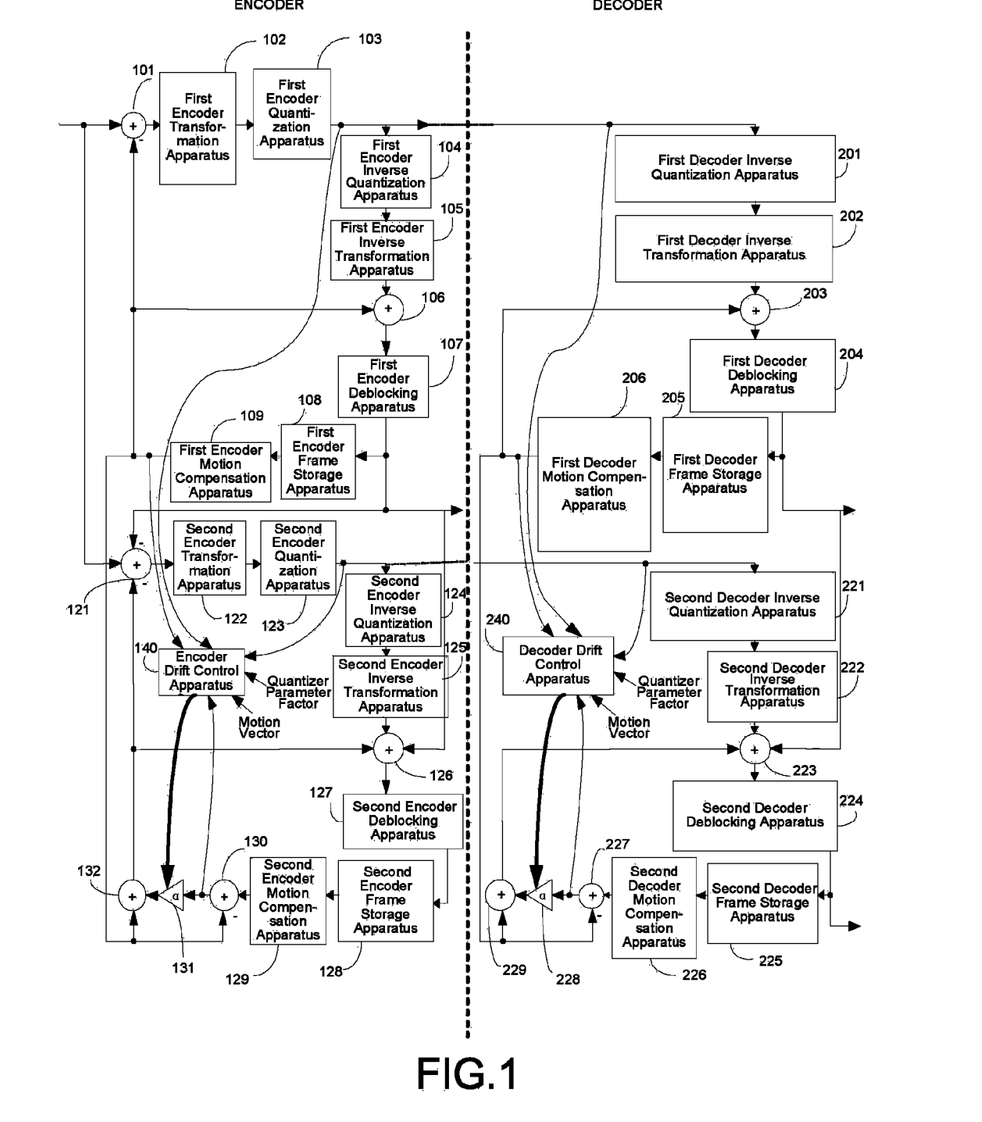
FIG. 1 is a block diagram of an error control system for video coding according to an embodiment of the present invention.

The detailed structure of the error control system for the video coding provided by an embodiment of the present invention is illustrated in FIG. 1.

In FIG. 1, the base layer encoding apparatus includes a first encoder subtraction apparatus 101, a first encoder output processing apparatus comprised of a first encoder transformation apparatus 102 and a first encoder quantization apparatus 103, and a first encoder feedback apparatus comprised of a first encoder inverse quantization apparatus 104, a first encoder inverse transformation apparatus 105, a first encoder addition apparatus 106, a first encoder deblocking apparatus 107, a first encoder frame storage apparatus 108 and a first encoder motion compensation apparatus 109.

In FIG. 1, the enhancement layer encoder apparatus includes a second encoder subtraction apparatus 121, a second encoder output processing apparatus comprised of a second encoder transformation apparatus 122 and a second encoder quantization apparatus 123, and a second encoder feedback apparatus comprised of a second encoder inverse quantization apparatus 124, a second encoder inverse transformation apparatus 125, a second encoder addition apparatus 126, a second encoder deblocking apparatus 127, a second encoder frame storage apparatus 128 and a second encoder motion compensation apparatus 129, a third encoder subtraction apparatus 130, a leaky factor apparatus 131 and a third encoder addition apparatus 132.

The external digital signal is transformed by the first encoder transformation apparatus 102 and subsequently quantized by the first encoder quantization apparatus 103. A first encoded digital signal is thus generated. The transformation apparatus may adopt a variety of forms of transformation, for example, Discrete Cosine Transformation (DCT), which transforms the pixel values (or values of the residual frames) to a sequence of coefficients in the frequency domain. The first encoder quantization apparatus 103 lessens the accuracy of each coefficient in the frequency domain. As such, the values which approximate to zero are set to zero, and only some non-zero values are remained. The first encoded digital signal may be divided into two signals. One is output to the decoder, while the other is output to the first encoder inverse quantization apparatus 104 for inverse quantization. The signal which has been inversely quantized is inversely transformed by the first encoder inverse transformation apparatus 105, combined with the motion-compensated signal at the first encoder addition apparatus 106, then output to the first encoder deblocking apparatus 107 to have the blocking effect filtered and subsequently stored in the first encoder frame storage apparatus 108. The first encoder motion compensation apparatus 109 performs motion compensation upon the information stored in the first encoder frame storage apparatus 108 and feeds back the motion-compensated signal to the first encoder subtraction apparatus 101 and the first encoder addition apparatus 106.

At the same time, the external digital signal is transformed by the second encoder transformation apparatus 122 and subsequently quantized by the second encoder quantization apparatus 123. A second encoded digital signal is thus generated. The second encoded signal may be divided into two signals. One is output to the decoder, while the other is output to the second encoder inverse quantization apparatus 124 for inverse quantization. The signal which has been inversely quantized is inversely transformed by the second encoder inverse transformation apparatus 125, combined with the motion-compensated signal and the signal output from the first encoder deblocking apparatus 107 at the second encoder addition apparatus 126. The combined signal is output to the second encoder deblocking apparatus 127 to have the blocking effect filtered and stored in the second encoder frame storage apparatus 128. The second encoder motion compensated apparatus 129 performs motion compensation upon information of the reconstructed frame stored in the second encoder frame storage apparatus 128. After the motion-compensated signal is combined with the signal from the first encoder motion compensation apparatus 109 at the third encoder subtraction apparatus 130, the combined signal is attenuated by the encoder leaky factor apparatus 131 and is further combined with the signal from the first encoder motion compensation apparatus 109 at the third encoder addition apparatus 132. The third encoder addition apparatus 132 feeds back the combined signal to the second encoder addition apparatus 126 and the second encoder subtraction apparatus 121.

A encoder drift control apparatus 140 determines the amount of local error drift for the encoder according to the local information of the base layer encoding apparatus and the enhancement layer encoding apparatus and controls the encoder leaky factor according to the amount of error drift. The encoder drift control apparatus 140 determines the value of the leaky factor according the comparison between the linearly combined local information and a predetermined value and the comparison between the non-linearly combined local information and a predetermined value. The local information includes one or more of the followings: base layer information, enhancement layer information, the difference between the frame cache of the base layer and the frame cache of the enhancement layer on a pixel or block basis. The base layer information includes information of input video data after base-layer coding and/or information of input video data after motion compensation. The enhancement layer information includes information of input video data after enhancement-layer coding and/or information of input video data after motion compensation. The difference between the frame cache of the base layer and the frame cache of the enhancement layer on a pixel or block basis includes one or more of the followings: number, location, amplitude, quantization step, motion parameters of the quantized transformation coefficients of the local information. The encoder drift control apparatus 140 may transmit identification information indicative of the foregoing process of selecting the local information to the decoder drift control apparatus. Alternatively, the encoder drift control apparatus 140 may transmit the value of leaky factor directly to the decoder drift control apparatus.

In FIG. 1, the base layer decoder apparatus includes a first decoder inverse quantization apparatus 201, a first decoder inverse transformation apparatus 202, a first decoder addition apparatus 203, a first decoder deblocking apparatus 204, a first decoder frame storage apparatus 205 and a first decoder motion compensation apparatus 206. The first decoder frame storage apparatus 205 and the first decoder motion compensation apparatus 206 constitute a first encoder data regeneration apparatus. The first encoded digital signal is inversely quantized by the first decoder apparatus 201 and subsequently inversely transformed by the first decoder inverse transformation apparatus 202. The inversely transformed signal generates a base layer decoded digital signal via the first decoder deblocking apparatus 204. The base layer encoded digital signal may be divided into two signals. One is the output, while the other is stored into the first decoder frame storage apparatus 205. The first decoder motion compensation apparatus 206 performs motion compensation upon the signal stored in the first decoder frame storage apparatus 205. The motion-compensated signal is fed back to the first decoder addition apparatus 203 and combined with the inversely transformed signal at the first decoder addition apparatus 203.

In FIG. 1, the enhancement layer decoder apparatus further includes a second decoder inverse quantization apparatus 221, a second decoder inverse transformation apparatus 222, a second decoder addition apparatus 223, a second decoder deblocking apparatus 224, a second decoder frame storage apparatus 225 and a second decoder motion compensation apparatus 226, a first decoder subtraction apparatus 227, a decoder leaky factor apparatus 228 and a third decoder addition apparatus 229. The external digital signal of the enhancement layer is quantized by the second decoder inverse quantization apparatus 221 and then inversely transformed by the second encoder inverse transformation apparatus 222. After the inversely transformed signal is added, at the second decoder addition apparatus 223, with the motion-compensated signal and the signal output from the first decoder deblocking apparatus 204, the added signal is output to the second decoder deblocking apparatus 224 to have the blocking effect filtered. The signal which has its blocking effect filtered may be divided into two signals. One is the output, while the other is stored into the second decoder frame storage apparatus 225. The second decoder motion compensation apparatus 226 performs motion compensation upon the signal stored in the second decoder frame storage apparatus 225. The motion-compensated signal is combined with the signal from the first decoder motion compensation apparatus 206 at the third decoder subtraction apparatus 227. The combined signal is attenuated by the decoder leaky factor apparatus 228, and is further combined with the signal from the first decoder motion compensation apparatus 206 at the third decoder addition apparatus 229. The third decoder addition apparatus 229 feeds back the combined signal to the second decoder addition apparatus 223.

A decoder drift control apparatus 240 determines the amount of local error drift for the decoder according to the local information of the base layer decoding apparatus and the enhancement layer decoding apparatus and controls the decoder leaky factor according to the amount of error drift. The drift control apparatus 240 determines the value of the leaky factor according the comparison between the linearly combined local information and a predetermined value and the comparison between the non-linearly combined local information and a predetermined value. The local information includes one or more of the followings: base layer information, enhancement layer information, the difference between the frame cache of the base layer and the frame cache of the enhancement layer on a pixel or block basis. The base layer information includes information of input video data after base-layer coding and/or information of input video data after motion compensation. The enhancement layer information includes information of input video data after enhancement-layer coding and/or information of input video data after motion compensation. The difference between the frame cache of the base layer and the frame cache of the enhancement layer on a pixel or block basis includes one or more of the followings: number, location, amplitude, quantization step, motion parameters of the quantized transformation coefficients of the local information. In the process of determining the amount of error drift by the decoder drift control apparatus 240, the decoder drift control apparatus 240 may select the local information of the base layer decoder apparatus and the enhancement layer decoder apparatus according to the identification information transmitted from the encoding end. The identification information herein is used to identify the process of encoding end selecting the local information. For example, the identification information may indicate that the encoding end has determined the number of the quantized transformation coefficients of the local information. The decoder drift control apparatus may also directly receive the value of leaky factor for error drift control, transmitted from the encoder. The value of the leaky factor transmitted from the encoder is the value which is determined by the encoder according to the foregoing method of the embodiments of the present invention.

Figure 2:
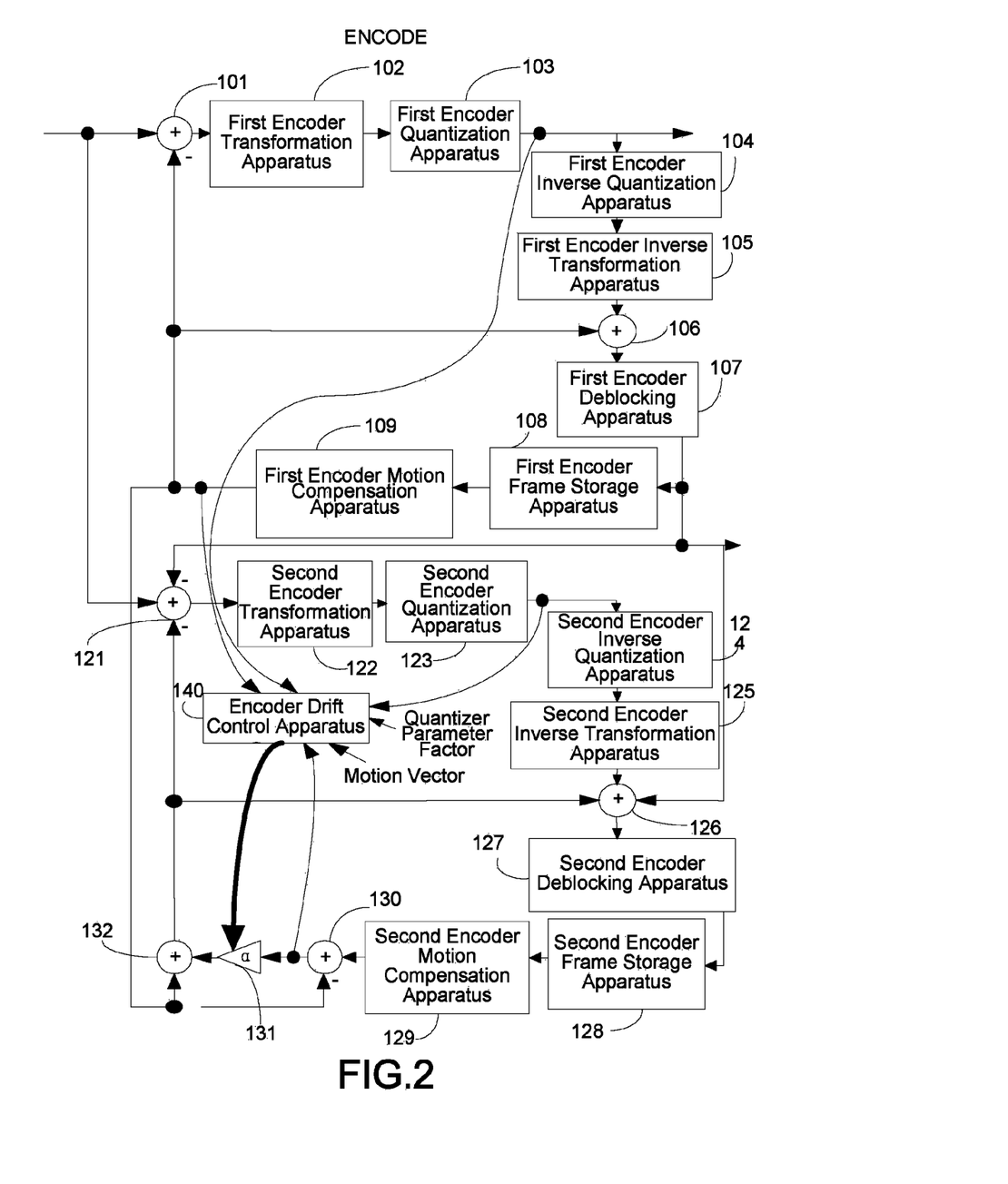
FIG. 2 is a block diagram of the encoder in the error control system for video coding according to an embodiment of the present invention.

An embodiment of the present invention further provides an encoder in the error control system for video coding, as illustrated in FIG. 2.

The encoder of FIG. 2 includes a base layer encoding apparatus and at least one enhancement layer encoding apparatus. The encoder further includes an encoder drift control apparatus. The encoder drift control apparatus is configured to determine the amount of local error drift for the encoder according to the local information of the base layer encoding apparatus and the enhancement layer encoding apparatus and control the value of an encoder leaky factor according to the amount of error drift.

The drift control apparatus determines the value of the leaky factor according the comparison between the linearly combined local information and a predetermined value and the comparison between the non-linearly combined local information and a predetermined value. The local information includes one or more of the followings: base layer information, enhancement layer information, the difference between the frame cache of the base layer and the frame cache of the enhancement layer on a pixel or block basis. The base layer information includes information of input video data after base-layer coding and/or information of input video data after motion compensation. The enhancement layer information includes information of input video data after enhancement-layer coding and/or information of input video data after motion compensation. The difference between the frame cache of the base layer and the frame cache of the enhancement layer on a pixel or block basis includes one or more of the followings: number, location, amplitude, quantization step, motion parameters of the quantized transformation coefficients of the local information. The encoder drift control apparatus 140 may transmit identification information indicative of the foregoing process of selecting the local information to the decoder drift control apparatus. Alternatively, the encoder drift control apparatus 140 may transmit the value of leaky factor directly to the decoder drift control apparatus.

Figure 3:
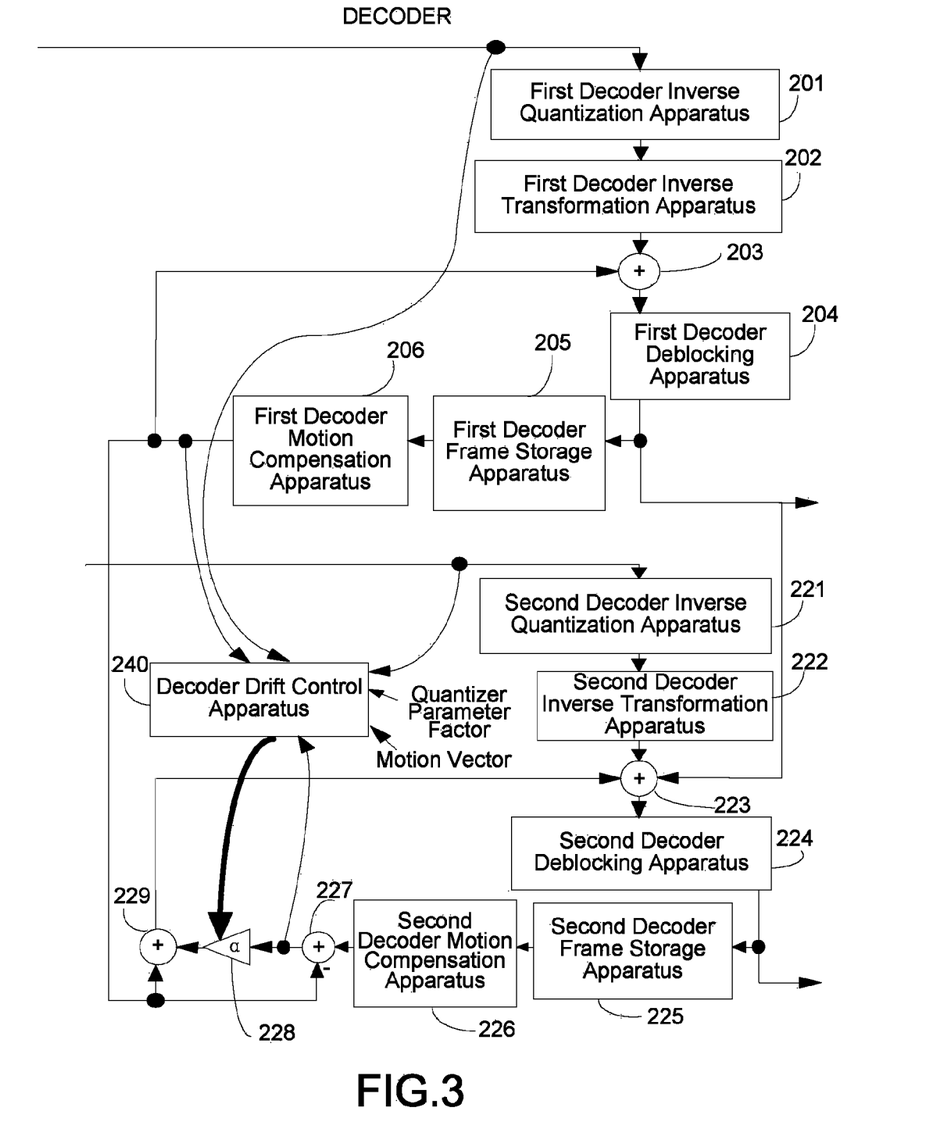
FIG. 3 is a block diagram of the decoder in the error control system for video coding according to an embodiment of the present invention.

An embodiment of the present invention further includes a decoder in the error control system for video coding, as illustrated in FIG. 3. The decoder of FIG. 3 includes a base layer decoding apparatus and at least one enhancement layer decoding apparatus. The decoder further includes a decoder drift control apparatus. The decoder drift control apparatus is configured to determine the amount of local error drift for the decoder according to the local information of the base layer encoding apparatus and the enhancement layer decoding apparatus and control the value of a decoder leaky factor according to the amount of error drift.

The decoder drift control apparatus determines the value of the leaky factor according to the comparison between the linearly combined local information and a predetermined value and the comparison between the non-linearly combined local information and a predetermined value. The local information includes one or more of the followings: base layer information, enhancement layer information, the difference between the frame cache of the base layer and the frame cache of the enhancement layer on a pixel or block basis. The base layer information includes information of input video data after base-layer coding and/or information of input video data after motion compensation. The enhancement layer information includes information of input video data after enhancement-layer coding and/or information of input video data after motion compensation. The difference between the frame cache of the base layer and the frame cache of the enhancement layer on a pixel or block basis includes one or more of the followings: number, location, amplitude, quantization step, motion parameters of the quantized transformation coefficients of the local information. In the process of determining the amount of error drift by the decoder drift control apparatus, the decoder drift control apparatus may select the local information of the base layer decoder apparatus and the enhancement layer decoder apparatus according to the identification information transmitted from the encoding end. The identification information herein is used to identify the process of selecting the local information by the encoding end. For example, the identification information may indicate that the encoding end has determined the number of the quantized transformation coefficients of the local information. The decoder drift control apparatus may also directly receive the value of leaky factor for error drift control, transmitted from the encoder. The value of the leaky factor transmitted from the encoder is the value which is determined by the encoder according to the foregoing method of the embodiments of the present invention.

Figure 4:
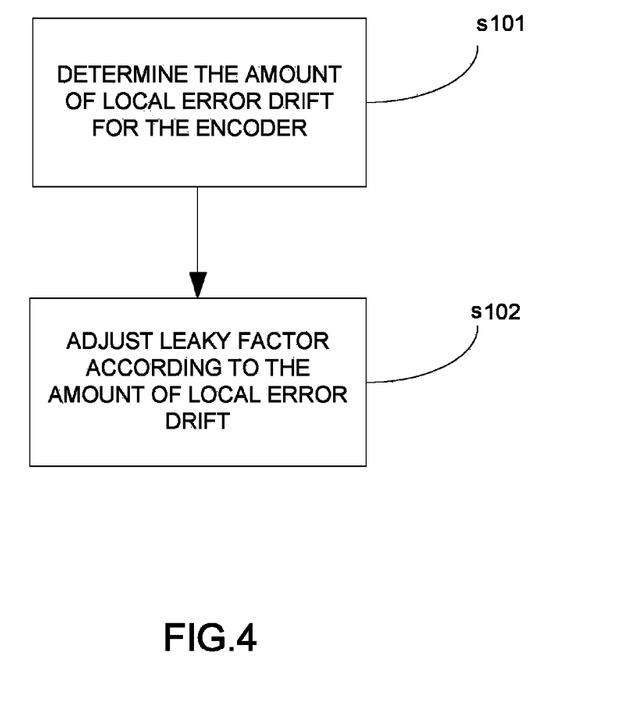
FIG. 4 is a flowchart of a error control method for video coding according to an embodiment of the present invention.

An embodiment of the present invention further provides an error control method for video coding, as illustrated in FIG. 4.

In FIG. 4, at s101, the amount of local error drift of the encoder and the decoder is determined.

The error control device may design the leaky factor based on the corresponding block parameters or other block parameters of the previous coding layer, or joint parameters of the block. The parameters herein include one or more of the followings: number, location, amplitude of the quantized transformation coefficients. For example, $\alpha$ may be determined in a linear manner based on the number of the non-zero coefficients in the corresponding block of the previous layer. $\alpha$ may also be determined in a non-linear manner based on the number of the non-zero coefficients in the corresponding block of the previous layer. The error control device may design the leaky factor based in part on the joint quantization step size with respect to the corresponding block or other blocks of the current layer or previous layer. The error control device may design the leaky factor based in part on motion-compensation prediction signals of the block of the current enhancement layer prior to attenuation or motion-compensation prediction signals of the corresponding block of the previous coding layer before or after attenuation, and joint of the foregoing signals. The above signal may be the average of the prediction signals, or the difference between the enhancement layer blocks and the base layer blocks. For example, in one implementation, the difference between the signal energy of the prediction signal of the current enhancement layer and that of the previous interlayer serves as an indicator for the presence of the error drift. When the quantization parameter (QP) value of the current block exceeds a threshold, the prediction signal is truncated to an allowable range. The error control device may design the leaky factor based in part on the motion parameters, such as macroblock partition, and motion vector group of the current/adjacent block.

In this process, the quantization step size may be indicated by the quantization parameter (QP) which reflects the information indicative of the compression of space details. For example, if QP is small, most of the details will be preserved. If the QP increases, some details will be lost and the code rate will be decreased. However, the image distortion will be strengthened and the image quality will be degraded accordingly. In other words, QP is in inverse proportion to bit rate and such inverse proportional relationship will become more evident with the increase of the video source complexity. QP may be dynamically adjusted based on the estimation of the source complexity, the size of the decoding buffer and network bandwidth such that a desirable bit rate can be obtained.

With respect to the prediction mode of H. 264, a macroblock (MB) can be divided into different modes of seven types of sizes. Multiple partition modes as well as the partitioned sub-macroblock may be more consistent with the shape of the actual moving objects. Each macroblock contains 1, 2, 4, 8, or 16 motion vectors.

At s102, the leaky factor is adjusted according to the amount of local error drift. A reference list may be preset. When the data which is obtained by linearly or nonlinearly combining the above local information corresponds to a particular value, adjustment can be performed according to the leaky factor to which the value corresponds.

In this process, the implementation of the method for adjusting the leaky factor is described below. Syntax element max_diff_ref_scale_for_zero_base_block, with a range of 0-31, is set as a maximum scale factor for scaling the differential reference signal according to the present SVC standard. Accordingly, the maximum leaky factor may be alphaMax=1 or alphaMax=(max_diff_ref_scale_for_zero_base_block+1)/32. Meanwhile, the value of leaky factor of the current transformation block, alphaCurr, is set to be controlled by the number (nCB) of quantized transformation coefficients of the base layer transformation block, wherein the threshold is the number of coefficients nCTrs and the scale factor sF, for example, nCRrs=4, sR=4. If 0<nCB<=nCTrs, the value of the leaky factor of the current transformation block may be expressed as alphaCurr=alphaMax*(1−SF*nCB), otherwise, the value of the leaky factor of the current transformation block, alphaCurr, is zero.

The foregoing teachings are merely a number of preferred embodiments of the present invention. It shall be noted that various improvements and modifications can be made by the ordinary people skilled in the art without departing from the principle of the present invention. These improvements and modifications shall be construed as being within the scope of protection of the present invention.

What is claimed is:

1. An encoder in an error control system for video coding, comprising a base layer encoding apparatus and at least one enhancement layer encoding apparatus, the encoder further comprising:
   an encoder drift control apparatus, configured to adjust a value of an encoder leaky factor according to local information of the base layer encoding apparatus, wherein the local information is number of quantized transformation non-zero coefficients of a current block in the base layer;
   and the enhancement layer encoding apparatus is configured to attenuate a motion-compensated signal of the current block in the enhancement layer according to the adjusted value of the encoder leaky factor to control an error drift;
   wherein the encoder drift control apparatus is configured to adjust the value of the encoder leaky factor of the current block, alphaCurr, according to the following formula:

if 0=nCTrs, then alphaCurr=alphaMax*(1−sF*nCB); else alphaCurr is zero;

wherein nCB is a number of quantized transformation non-coefficients of a current block in the base layer, nCTrs is a predetermined threshold for the quantized transformation non-coefficients, alphaMax is a maximum leaky factor, and sF is a scale;
   wherein the maximum leaky factor alphaMax equals to 1; or the maximum leaky factor alphaMax equals to (max_cliff ref scale for zero_base_block-I-1)/32; and wherein a syntax element max_cliff ref scale_for_zero_base_block, with a range of 0-31, is set as a maximum scale factor for scaling a differential reference signal according to a present SVC standard.

2. The encoder according to claim 1, wherein the base layer encoding apparatus comprises a first encoder motion compensation apparatus; and wherein the enhancement layer encoding apparatus comprises a second encoder motion compensation apparatus, a third encoder subtraction apparatus and an encoder leaky factor apparatus;
   wherein the third encoder subtraction apparatus is configured to combine the motion-compensated signal from the first encoder motion compensation apparatus and the motion-compensated signal from the second encoder motion compensation apparatus; and
   wherein the encoder leaky factor apparatus is configured to attenuate the combined signal from the third encoder subtraction apparatus according to the value of the encoder leaky factor, to control the error drift.

3. An decoder in an error control system for video coding, comprising a base layer decoding apparatus and at least one enhancement layer decoding apparatus, the decoder further comprising:
   a decoder drift control apparatus, configured to adjust a value of a decoder leaky factor according to local information of the base layer decoding apparatus, wherein the local information is number of quantized transformation non-zero coefficients of a current block in the base layer;
   and the enhancement layer decoding apparatus is configured to attenuate a motion-compensated signal of the current block in the enhancement layer according to the value of the decoder leaky factor to control an error drift;
   wherein the decoder drift control apparatus (240) is configured to adjust a value of an encoder leaky factor of the current block, alphaCurr, according to the following formula:

if 0<nCB<=nCTrs, then alphaCurr=alphaMax*(1−sF*nCB); else alphaCurr is zero;

wherein nCB is thea number of quantized transformation non-coefficients of a current block in the base layer, nCTrs is a predetermined threshold for the quantized transformation non-coefficients, alphaMax is a maximum leaky factor, and sF is a scale factor;

wherein the maximum leaky factor alphaMax equals to 1; or the maximum leaky factor alphaMax equals to (max_diff_ref_scale_for_zero_base_block+1)/32; and wherein a Syntax element max_diff_ref_scale_for_zero_base_block, with a range of 0-31, is set as a maximum scale factor for scaling a differential reference signal according to a present SVC standard.

4. The decoder according to claim 3, wherein the base layer decoding apparatus comprises a first decoder motion compensation apparatus; and wherein the enhancement layer decoding apparatus comprises a second decoder motion compensation apparatus, a first decoder subtraction apparatus and an decoder leaky factor apparatus;

wherein the first decoder subtraction apparatus is configured to combine the motion-compensated signal from the first decoder motion compensation apparatus and the motion-compensated signal from the second decoder motion compensation apparatus; and wherein the decoder leaky factor apparatus is configured to attenuate the combined signal from the first decoder subtraction apparatus according to the value of the decoder leaky factor, to control the error drift.

5. The decoder according to claim 3, wherein, in a process of adjusting the value of the decoder leaky factor by the decoder drift control apparatus, the decoder drift control apparatus selects the local information of the base layer decoding apparatus according to identification information which is transmitted from an encoding end and which is used for identifying a process of selecting the local information by the encoding end, or the decoder drift control apparatus utilizes a received leaky factor which is adjusted by the decoder drift control apparatus as the decoder leaky factor.

6. An error control method for video coding, comprising:

adjusting a value of an encoder/decoder leaky factor according to a local information of the encoder/decoder, wherein the local information is number of quantized transformation non-zero coefficients of a current block in a base layer; and attenuating a motion-compensated signal of the current block in an enhancement layer according to the value of the encoder/decoder leaky factor, to control an error drift;

wherein the adjusting the value of a leaky factor according to local information comprises:

adjusting the value of the encoder leaky factor of the current block, alphaCurr, according to the following formula:

$$\text{if } 0 < nCB <= nCTrs, \text{ then alphaCurr} = \text{alphaMax}*(1-sF*nCB); \text{ else alphaCurr is zero;}$$

wherein nCB is a number of quantized transformation non-coefficients of a current block in the base layer, nCTrs is a predetermined threshold for the quantized transformation non-coefficients, alphaMax is a maximum leaky factor, and sF is a scale factor;

wherein the maximum leaky factor alphaMax equals to 1; or the maximum leaky factor alphaMax equals to (max_diff_ref_scale_for_zero_base_block+1)/32; and wherein a Syntax element max_diff_ref_scale_for_zero_base_block, with a range of 0-31, is set as a maximum scale factor for scaling a differential reference signal according to a present SVC standard.

7. The method according to claim 6, further comprising:

transmitting an identification information which is used for identifying a process of selecting the local information from an encoding end to a decoding end.

* * * * *

UNITED STATES PATENT AND TRADEMARK OFFICE
CERTIFICATE OF CORRECTION

PATENT NO. : 8,345,776 B2
APPLICATION NO. : 12/236932
DATED : January 1, 2013
INVENTOR(S) : Lianhuan Xiong It is certified that error appears in the above-identified patent and that said Letters Patent is hereby corrected as shown below:

In the Claims

Col. 10, line 19, claim 1, delete "if 0=nCTrs," and insert --if 0<nCB<=nCTrs--.
Col. 10, lines 22-23, claim 1, delete "non-coefficients" and insert --non-zero coefficients--.
Col. 10, line 24, claim 1, delete "non-coefficients" and insert --non-zero coefficients--.
Col. 10, line 26, claim 1, after "scale" insert --factor--.
Col. 10, line 29, claim 1, delete "(max_cliff ref scale for zero_base_block-I-1)/32;" and insert --(max_diff_ref_scale_for_zero_base_block+1)/32;--.
Col. 10, line 30, claim 1, delete "max_cliff ref scale_for_" and insert --max_diff_ref_scale_for_--.
Col. 10, line 62, claim 3, delete "(240)".
Col. 11, line 1, claim 3, delete "thea" and insert --a--.
Col. 11, line 2, claim 3, delete "non-coefficients" and insert --non-zero coefficients--.
Col. 11, line 4, claim 3, delete "non-coefficients" and insert --non-zero coefficients--.
Col. 11, line 7, claim 3, delete "(max" and insert --(max_--.
Col. 12, lines 19-20, claim 6, delete "non-coefficients" and insert --non-zero coefficients--.
Col. 12, line 22, claim 6, delete "non-coefficients" and insert --non-zero coefficients--.

Signed and Sealed this
Twenty-ninth Day of April, 2014

Michelle K. Lee
*Deputy Director of the United States Patent and Trademark Office*